R. Densmore,
Making Staves.
N° 25,321.                     Patented Sep. 6, 1859.

Witnesses
J. Follett
E. Densmore

Inventor
R. Densmore

UNITED STATES PATENT OFFICE.

R. DENSMORE, OF SOUTH HAVEN, MICHIGAN.

MACHINE FOR SAWING STAVES.

Specification of Letters Patent No. 25,321, dated September 6, 1859.

*To all whom it may concern:*

Be it known that I, R. DENSMORE, of South Haven, in the county of Van Buren and State of Michigan, have invented certain new and useful Improvements in Machines for Sawing Staves; and I do hereby declare that the following is a full, clear, and exact description thereof, reference being had to the accompanying drawings, and to the letters of reference marked thereon, in which—

Figure 1:
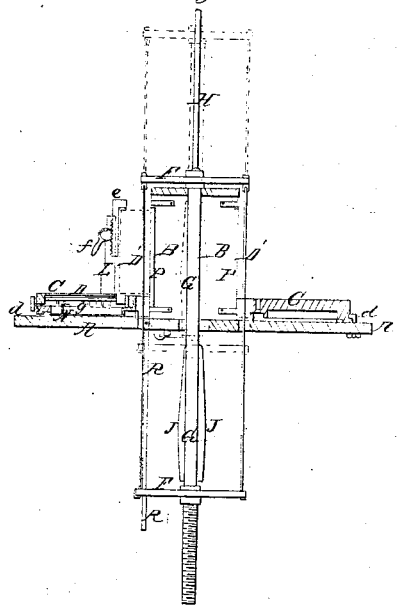
Figure 2:
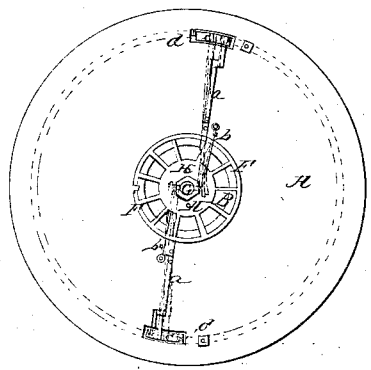
Figure 3:
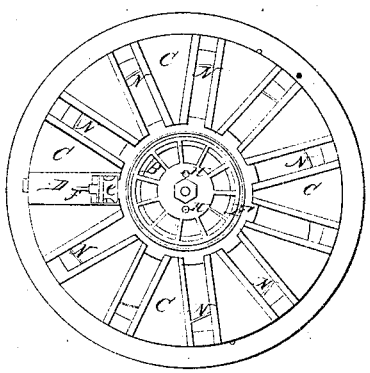

Figure 1, represents a vertical middle section taken through the machine, showing the saws in two positions. Fig. 2, is a bottom view of the table, and Fig. 3, shows a top view of the same.

The nature of my invention consists in hanging a gang of saws upon circular gates having a vertical reciprocating motion around a drum against which abuts the bolts or blocks from which the staves are to be sawed; and in encircling the drum by a rotary table on which are arranged, radially, a number of automatic carriages for holding the bolts against the drum and for feeding the same up to the drum as fast as the staves are sawed, said table revolving around the drum and feeding the staves up to the saws by means of ratchets and pawls operated by cams fixed upon the saw shaft.

My invention consists also in the arrangement of rolling guides in front and back of the saws around the drum operated by springs situated within said drum so as to hold the stave after it is sawed until it falls through a conductor, the whole being described and represented as follows:—

A, represents a circular fixed bed plate in the center of which is a drum B, permanently fixed to this bed and against which the stave blocks all abut. Upon this bed plate rests a rotary table C, which has carriages D, arranged radially upon its surface and guided in suitable grooves in said table so as to automatically feed the stave blocks up against the periphery of drum B, as the staves are sawed, so that each stave will be of an equal thickness.

The drawings represent only one carriage, D, upon the table, but a description of the construction and operation of this one will give a clear understanding of the others they all being actuated by the same mechanical arrangement.

The saws D', for cutting out the staves are hung in circular gates F, F, which gates are fixed above and below the table to the saw shaft G, and guided in their vertical movement by guide rods H, H, which are fixed to the heads of drum B.

Any number of saws may be hung around the saw gates according to the number of feeding carriages. The saws are operated by a crank fixed in the frame upon which the machine is to rest. These saws are stationary with respect to the bed plate A, and drum B, while the blocks are fed up to the saws and to the drum by the rotary table C, and carriages B, as follows:—Underneath of the stationary bed plate A, as clearly shown in Fig. 2, are arranged two spring arms *a, a,* which are held against the surface of cams J, J, fixed on each side of the saw shaft G, as shown by Fig. 1, in two positions, by springs *b, b,* so that as the saws move up and down these arms will be operated simultaneously. The arms or levers *a, a,* proceed out to near the circumference of the bed-plate and carry on their ends pawls *c, c,* which engage with a circular ratchet *d,* on the under side of the table C, and thus as the saws are alternately raised and depressed they actuate the arms *a, a,* and these give motion to the table C, moving it the requisite distance to keep the saws constantly in action upon the bolts from which the staves are cut.

The sliding carriages which are arranged upon the table C, as above shown carry the blocks and feed them up to the cylinder as fast as the staves are cut therefrom in the following manner.

The carriages, one of which is shown by Fig. 1, consist of a slide plate D, fitted and working in a groove in the top of the rotary table C, to which is fixed a vertical standard L, with a movable dog *e,* operated by a lever *f,* for clamping the block fast to the carriage as shown by Fig. 1, in red lines. The carriages are then moved forward with the blocks and these latter presented to the saws as the table rotates for sawing off the staves by means of cogs or teeth *g,* projecting from the under side of each carriage which are operated by curved plates N, projecting from the top of the bedplate A, which move each carriage forward or toward the center of the table the thickness of a stave and keep the blocks closely abutting against the side of the drum B. After a saw has passed through a block the stave is held by a rolling guide P, attached vertically to the drum B, by springs, not shown, and projecting slightly beyond the surface, until it falls through conductor R, and is finally discharged from the machine. The operation of this machine for sawing staves may be briefly described as follows:—The blocks or bolts are clamped to each of the carriages surrounding the central drum B, and then moved up against the surface of said drum. The saws are then set in motion and as fast as the blocks are presented to the saws and the staves sawed therefrom they are fed up to the drum in the direction of the center of the table so as to be ready for the next saw and so on, the operation continues until the bolts are all sawed up, when others are replaced in the same manner as described for the first.

What I claim as my invention and desire to secure by Letters Patent, is,

1. Surrounding the stationary drum B, with a series of saws all hung in one gate and having the same movement in combination with the rotating table C, for the purposes and in the manner represented and specified.

2. I claim in combination with the rotary table and drum B, the sliding carriages, when the same are arranged radially around said drum and operated automatically to feed the bolts up against the drum B, for the purposes and in the manner herein specified.

3. I claim the rolling spring guides P, in combination with the drum B, for discharging the staves from the machine after they have been sawed as set forth.

R. DENSMORE.

Witnesses:
S. FOLLETT,
E. DENSMORE.